United States Patent [19]

Hashimoto, deceased et al.

[11] Patent Number: 5,157,249
[45] Date of Patent: Oct. 20, 1992

[54] MINIATURIZED OPTICAL PICK-UP WITH HIGH SENSITIVITY FOCUSING ERROR DETECTING DEVICE

[75] Inventors: Akihiko Hashimoto, deceased, late of Hachioji, by Keitaro Hashimoto, heir; Hirokazu Konishi; Hiroshi Miyajima, both of Hachioji, all of Japan

[73] Assignee: Olympus Optical Co., Ltd., Tokyo, Japan

[21] Appl. No.: 656,727

[22] Filed: Feb. 19, 1991

[51] Int. Cl.⁵ .............................................. G11B 7/08
[52] U.S. Cl. ............................. 250/201.5; 369/44.25; 369/44.41
[58] Field of Search ................... 250/201.5; 369/44.41, 369/44.25

[56] References Cited

U.S. PATENT DOCUMENTS

| | | | |
|---|---|---|---|
| 4,152,586 | 5/1979 | Elliott et al. | 250/201.5 |
| 4,843,603 | 6/1989 | Prikryl | 369/44.14 |

Primary Examiner—Constantine Hannaher
Attorney, Agent, or Firm—Stevens, Davis, Miller & Mosher

[57] ABSTRACT

Optical pick-up for reading information recorded on an optical card includes a light emitting diode, collimator lens, beam splitter and objective lens arranged so a de-focused illuminating light spot projects onto the card and reflects to a photodetector through the objective lens and beam splitter. The photodetector includes first light receiving regions arranged within a ring-shaped area where the luminance intensity of the beam does not substantially change even when a focus condition of the objective lens with respect to the card is varied, and second light receiving regions arranged outside the ring-shaped area. A focusing error signal is obtained by deriving a difference between a first sum of output signals of the first light receiving regions and a second sum of output signals of the second light receiving regions. The collimator lens may be arranged between the beam splitter and the objective lens and the photodetector arranged on a focal point of the collimator lens. Or, a sapphire ball may be directly secured to a light emitting diode to form a ring-shaped bright portion in an illuminating light beam emanating from the sapphire ball. Then the first and second light receiving regions of the photodetector are arranged on both sides of a caustic surface of an image of an illuminating light spot on the card. The focusing error signal can be obtained stably at a high sensitivity. Further the dynamic range of the focusing error signal can be widened.

30 Claims, 13 Drawing Sheets

FIG_1
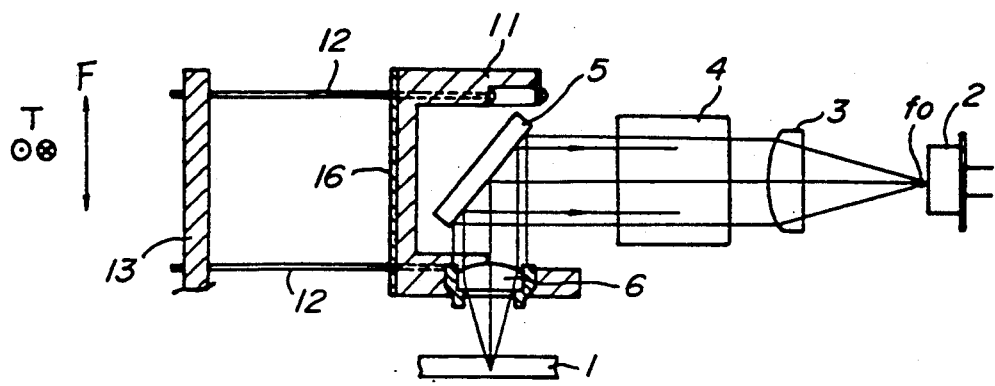
FIG_2
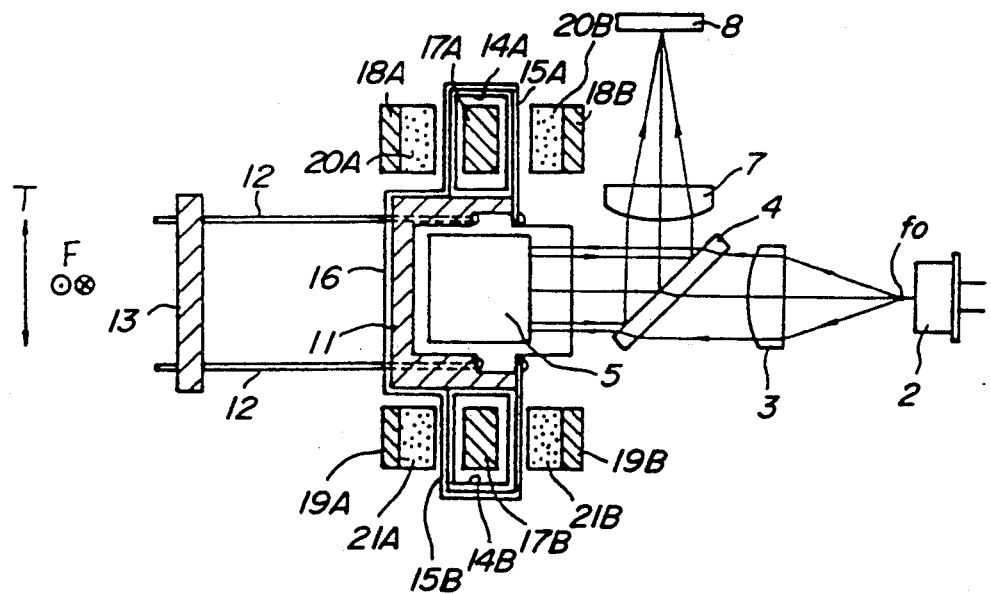

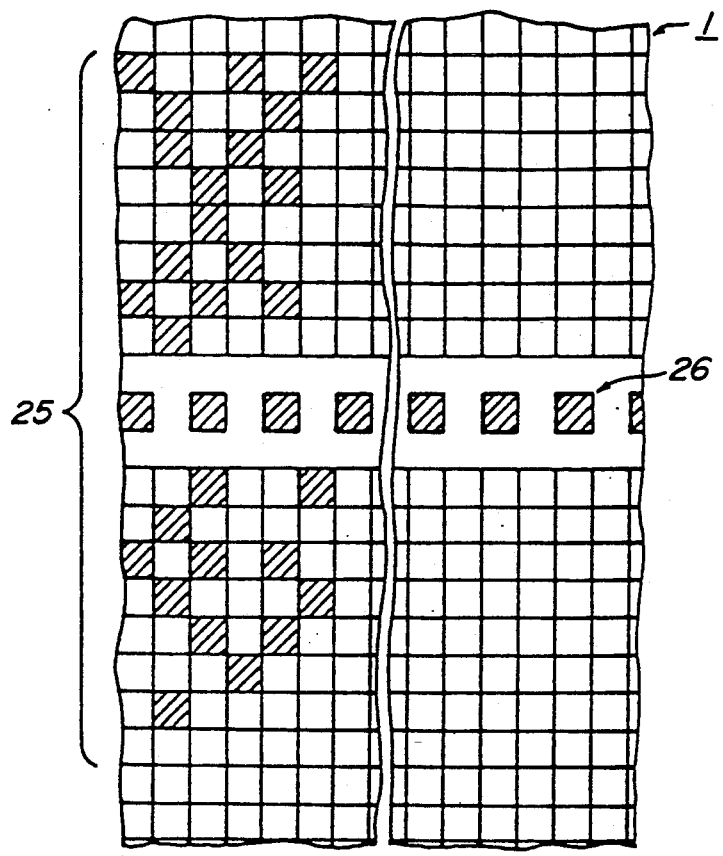
FIG_3

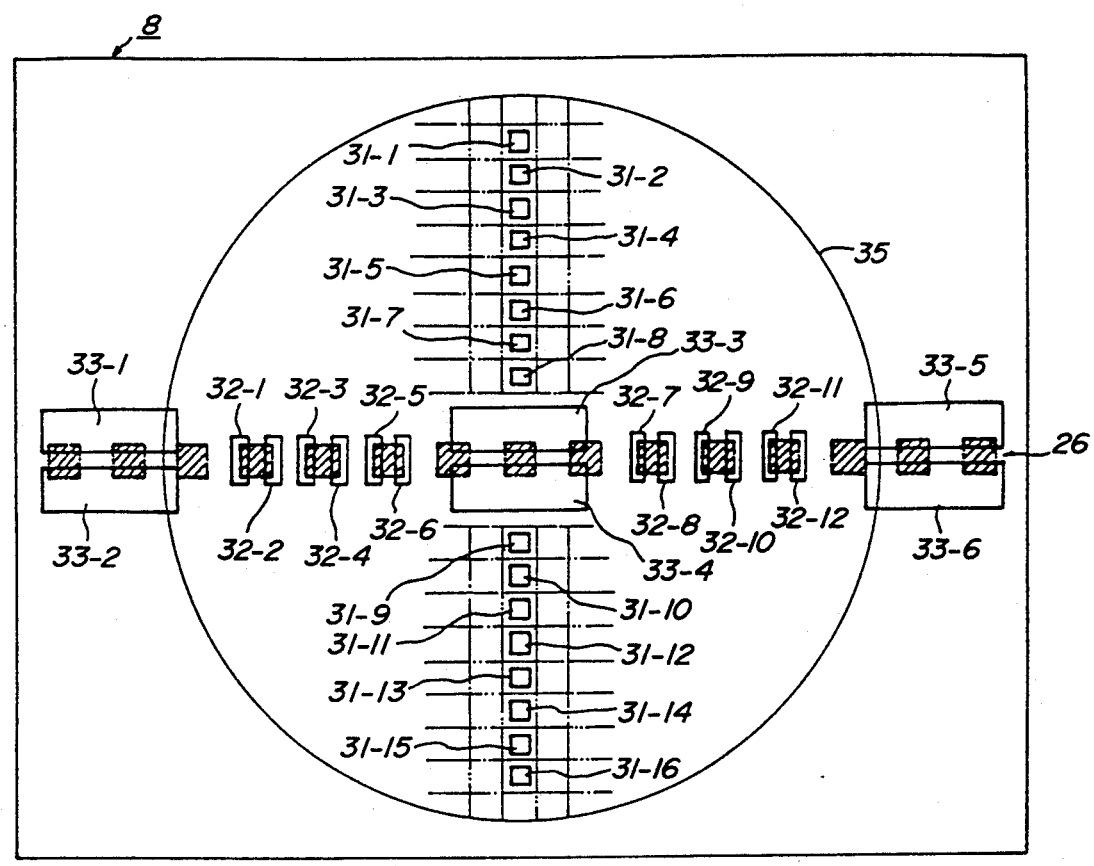
FIG_4

FIG_5
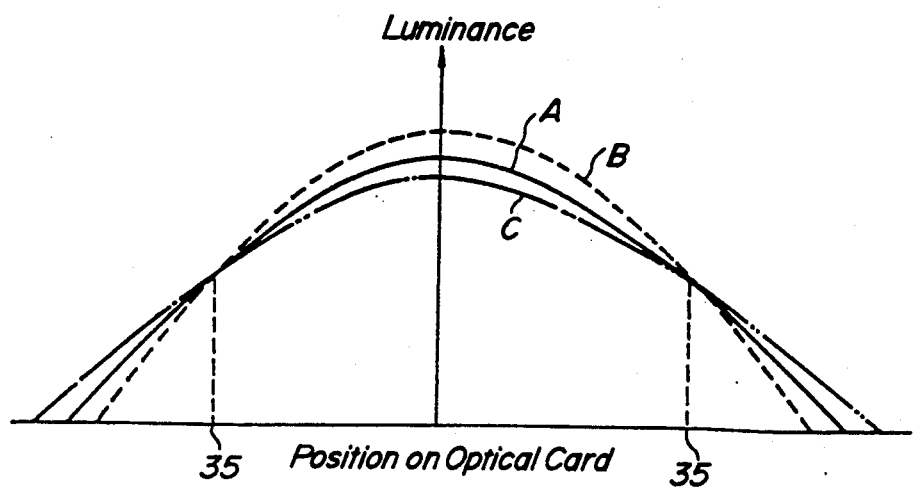
FIG_6A
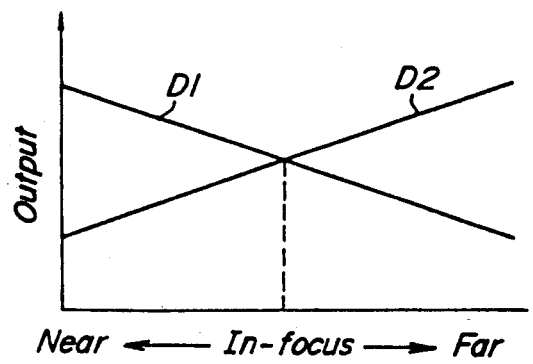
FIG_6B
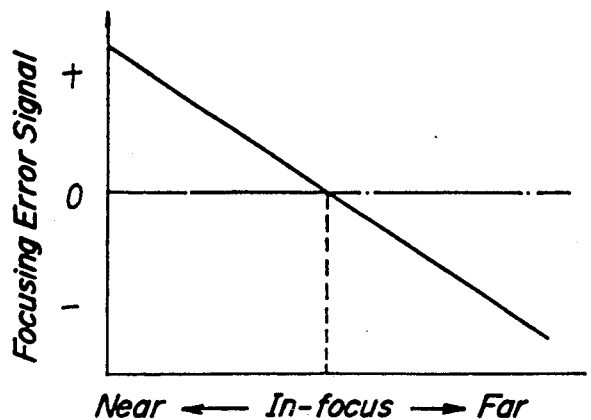

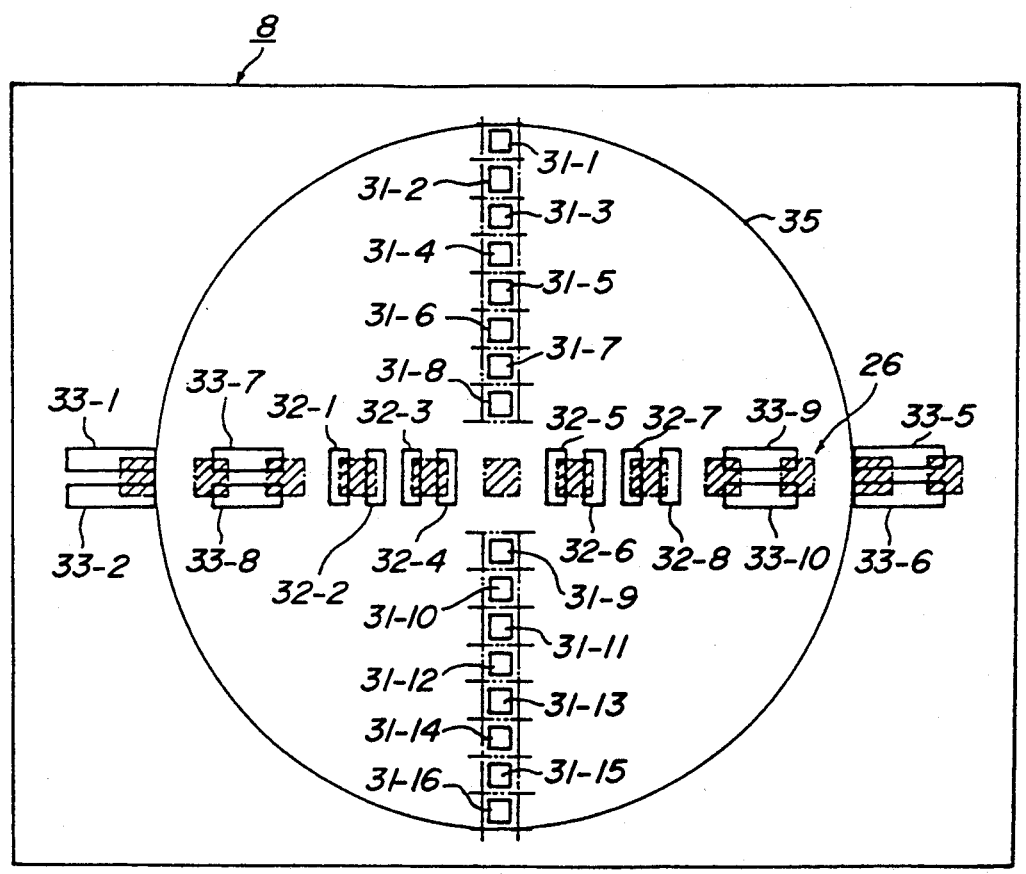
FIG_7

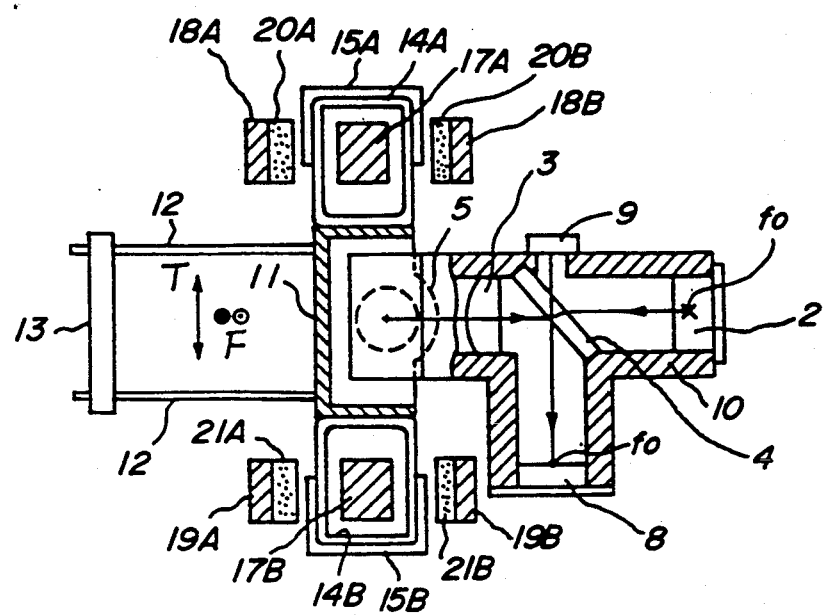
FIG_8
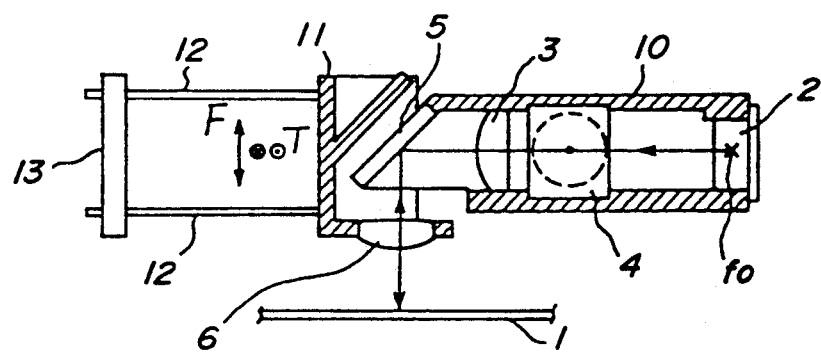
FIG_9

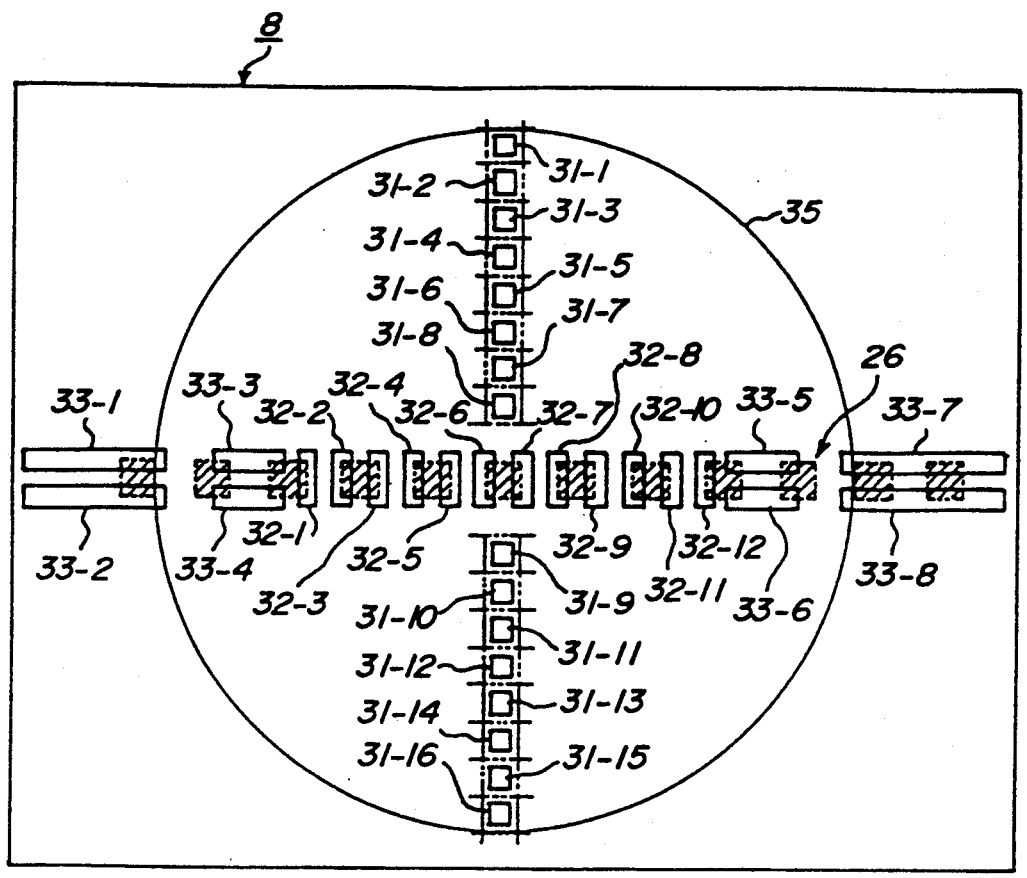
FIG_10

FIG_11
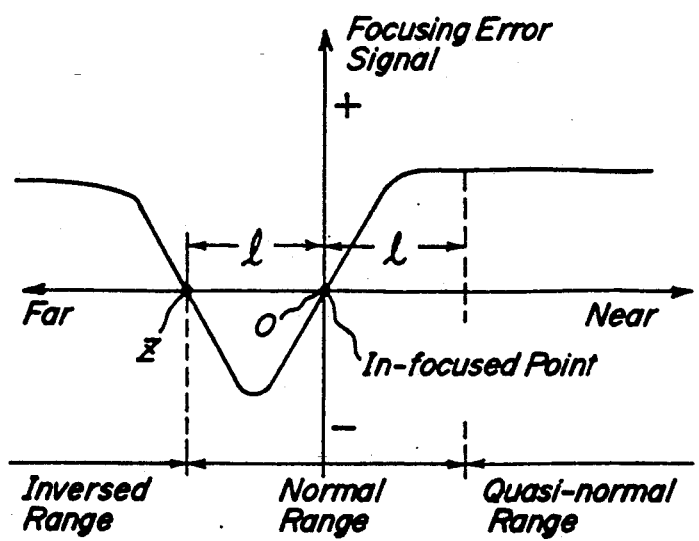

FIG._12
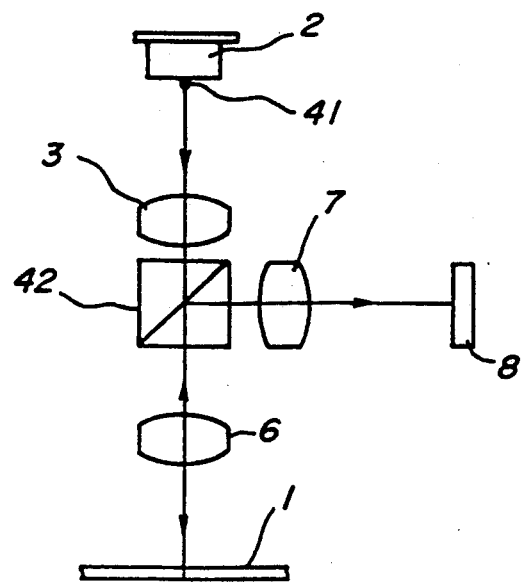
FIG._13
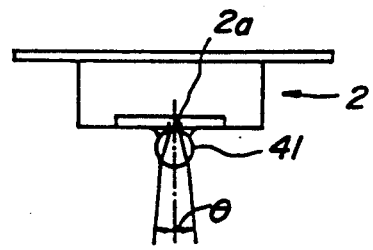
FIG._14
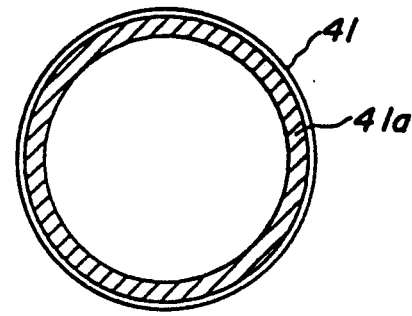

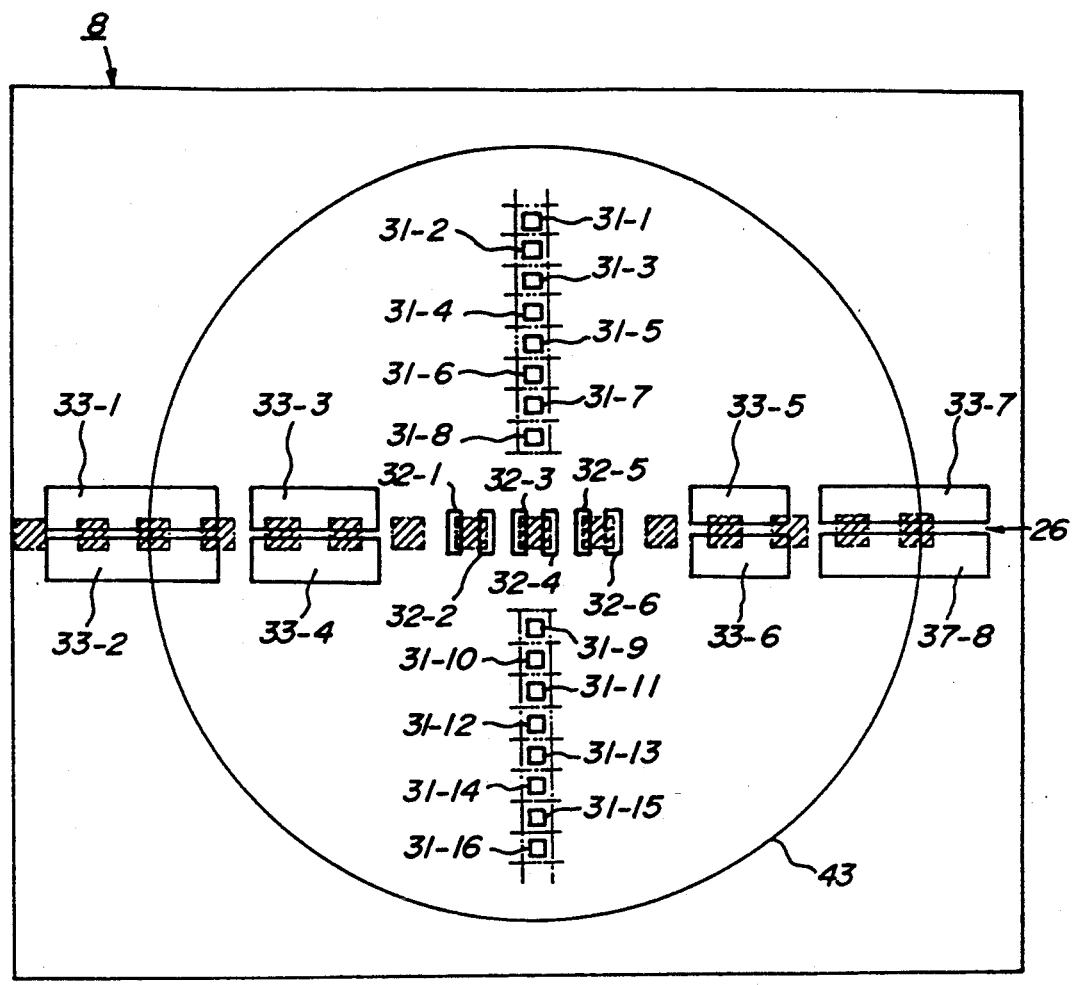
FIG._15

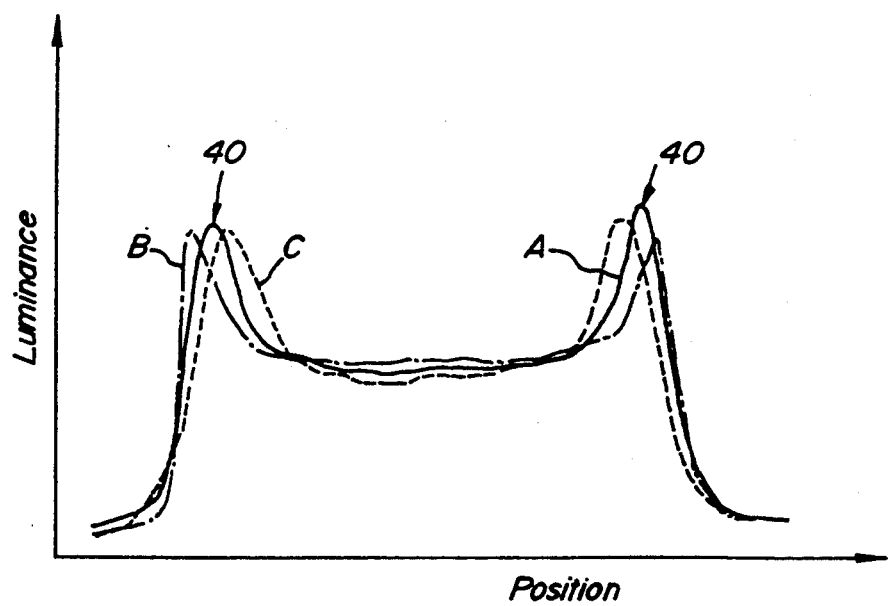
FIG_16

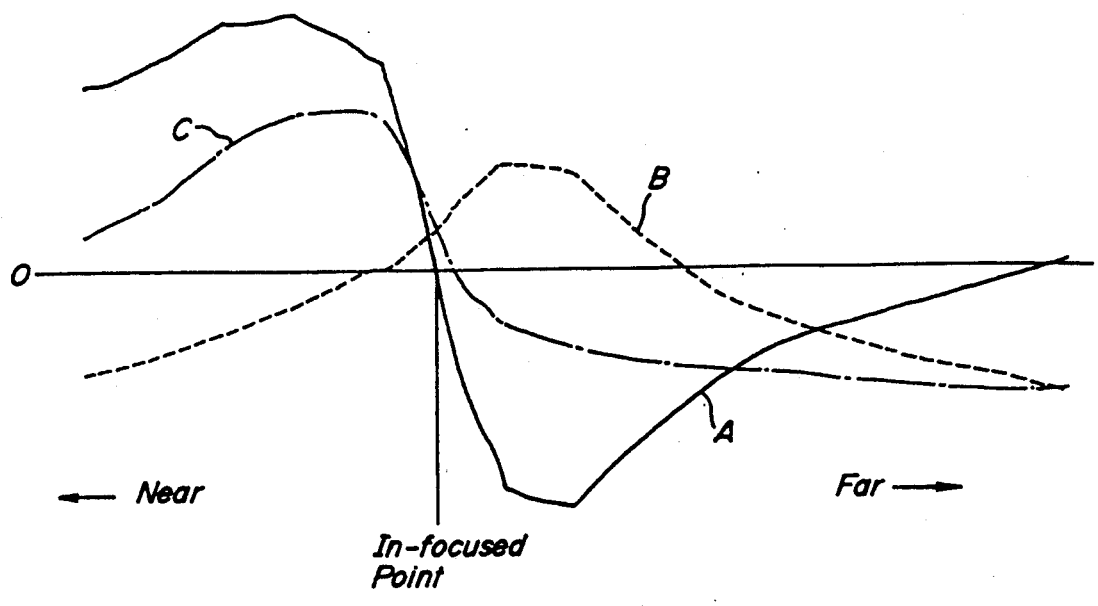
FIG_18

MINIATURIZED OPTICAL PICK-UP WITH HIGH SENSITIVITY FOCUSING ERROR DETECTING DEVICE

BACKGROUND OF THE INVENTION

Field of the Invention and Related Art Statement

The present invention relates to an optical pick-up for writing and/or reading information on and/or from an optical record medium such as optical card and optical disk, and more particularly to a focusing error detecting device for use in the optical pick-up for writing and/or reading information on and/or from an optical card.

In Japanese Patent Application Laid-open Publications Kokai Sho Nos. 62-279,523, 63-91,830 and 63-117,334, there is disclosed a focussing error detecting device. In this known focusing detecting device, a light beam is projected onto an optical card from an inclined direction and a light beam reflected by the optical card is received by a photodetector including two light receiving regions which are divided in a direction in which a light spot on the photodetector moves in accordance with the focus condition of the light beam on the optical card. Then a focusing error signal is obtained by deriving a difference between output signals generated by these light receiving regions The inventors of the instant application have experimentally found that the above mentioned known focusing error detecting device has the following drawback. That is to say, in the known focusing error detecting device, the two light receiving regions receive light rays which are reflected by the optical card at portions which are situated at diametrically opposed peripheral areas of the light spot projected onto the optical card, so that the luminance of the light rays received by the light receiving regions is low. Therefore, the sensitivity of detecting the focusing error is low and the focusing error detection is liable to be affected by noise, so that a focusing servo could not be performed stably.

In Japanese Patent Application Laid-open Publication Kokai Sho No. 57-205,833 there is described another known optical pick-up including the focusing error detecting device. In this known optical pick-up, a light beam emitted by a laser light source is first made incident upon a refractive gratings to obtain three light beams. Then, these light beams are projected onto an optical record medium such as an optical card, a compact disk and a video disk by means of a polarizing beam splitter, a collimator lens, a λ/4 plate and an objective lens, and light beams reflected by the optical record medium are received by a photodetector by means of the objective lens, λ/4 plate, polarizing beam splitter, and further by means of concave lens and cylindrical lens. The photodetector is divided into four light receiving regions, and the focusing error signal as well as the tracking error signal are derived by processing output signals generated by the light receiving regions.

In this known optical pick-up, the concave lens is provided for separating the three light beams reflected by the optical record medium and the cylindrical lens is arranged for introducing into the reflected light beam an aberration which is required for detecting the focusing error. Therefore, the construction of the optical pick-up is liable to be large and complicated, and the cost is increased.

Further in the known optical pick-up, the light beam emitted by the laser light source is converted into a parallel light beam, by means of the collimator lens and then the parallel light beam is made incident upon the objective lens. The optical record medium is placed on the focal point of the objective lens, so that the light spot having a very small diameter is projected onto the optical record medium. In an optical card disclosed in the above mentioned Japanese Patent Application Laid-open Publication Kokai Sho No. 63-7,533 there is disclosed an optical card in which a number of track units are formed in parallel with each other and in each of the track units there are formed a plurality of tracks. In such an optical card, a plurality of tracks in a track unit has to be read out simultaneously. However, when the optical card is placed at the focal point of the objective lens, it is difficult to effect the data reading accurately.

SUMMARY OF THE INVENTION

The present invention has for its object to provide a novel and useful optical pick-up in which the focus condition can be detected at a high sensitivity, so that the focus servo can be performed accurately and stably.

It is another object of the invention to provided an optical pick-up, which is small in size, simple in construction and cheap in cost.

It is still another object of the invention to provide an optical pick-up, by means of which information recorded in a plurality of tracks can be read out precisely.

It is still another object of the invention to provide an optical pick-up, in which the focus condition of a light spot projected onto an optical record medium can be detected over a wide range without being effected by the variation in the distribution of the light intensity of a light source.

According to the invention, an optical pick-up for reading information out of an optical record medium comprises:

illuminating means for projecting a light beam perpendicularly to the optical record medium;

first light receiving means arranged for receiving a light beam reflected by said optical record medium at a portion which is situated on one side of an unchanged area in which the luminance intensity of a light beam spot on the optical record medium does not substantially change in accordance with the focus condition to derive a first signal;

second light receiving means arranged for receiving a light beam reflected by said optical record medium at a portion which is situated on the other side of said unchanged area to derive a second signal; and a signal processing means for receiving said first and second signals generated by said first and second light receiving means to derive a focusing error signal which represents a focusing error of said illuminating means with respect to said optical record medium.

According to a second aspect of the present invention, an optical pick-up for recording and/or reproducing information on and/or from an optical record medium comprises:

a light source for emitting a light beam;

a beam splitter for transmitting or reflecting said light beam emitted from the light source;

a collimator lens for receiving the light beam emanating from said beam splitter, said light source being arranged at a de-focused position with respect to said collimator lens;

an objective lens for projecting the light beam emanating from said collimator lens onto an optical record medium and for introducing a light beam reflected by the optical record medium into the collimator lens and beam splitter;

a photodetector for receiving the light beam which is reflected by the optical record medium, transmitted through the objective lens and collimator lens and reflected by or transmitted through the beam splitter, said photodetector being arranged at a focal point of said collimator lens and driving a signal; and a signal processor for receiving said signal to derive a focus error signal.

In a preferable embodiment of the optical pick-up according to the second aspect of the invention, said light source is arranged to be shifted from a focal point of the collimator lens by such a distance that a distance between a focal point of said objective lens and a point at which the light beam emanating from the objective lens will be converged amounts to about 100–400 μm.

According to a third aspect of the invention, an optical pick-up for reading information recorded on an optical record medium comprises:

a light source for emitting a light beam;

an optical member for introducing a spherical aberration into said light beam emitted by said light source;

a beam splitter for reflecting or transmitting said light beam emanating from said optical member;

an objective lens for projecting the light beam emanating from said beam splitter and receiving a light beam reflected by an optical record medium;

a photodetector for receiving the light beam which is reflected by the optical record medium, transmitted through the objective lens and transmitted through or reflected by said beam splitter to derive a signal; and a processing circuit for receiving said signal generated by said photodetector to derive a focusing error signal.

In a preferable embodiment of the optical pick-up according to the third aspect of the present invention, said optical system for introducing the spherical aberration is formed by a sapphire ball directly secured to a light emitting area of a light emitting diode.

BRIEF DESCRIPTION OF THE DRAWINGS

FIG. 1 is cross sectional view showing a first embodiment of the optical pick-up according to the invention;

FIG. 2 is a cross sectional view of the optical pick-up shown in FIG. 1;

FIG. 3 is a schematic plan view illustrating an example of the track format of an optical card;

FIG. 4 is a plan view depicting the construction of an embodiment of the photodetector shown in FIG. 1;

FIG. 5 is a graph representing the variation of in the luminance distribution of the illuminating light spot;

FIGS. 6A and 6B are graphs explaining the manner of deriving the focusing error signal;

FIG. 7 is a schematic plan view showing another embodiment of the photodetector shown in FIG. 1;

FIG. 8 is a cross sectional view illustrating a second embodiment of the optical pick-up according to the invention;

FIG. 9 is a cross sectional view of the optical pick-up shown in FIG. 8;

FIG. 10 is a plan view illustrating the construction of the photodetector depicted in FIG. 8;

FIG. 11 is a graph representing the focusing error signal obtained by the optical pick-up shown in FIG. 8;

FIG. 12 is a schematic view showing a third embodiment of the optical pick-up according to the invention;

FIG. 13 is a cross sectional view illustrating the light source shown in FIG. 12;

FIG. 14 is a front view of the sapphire ball of the light source;

FIG. 15 is a plan view illustrating the construction of the photodetector shown in FIG. 12;

FIG. 16 is a graph depicting the distribution of the light intensity of the illuminating light spot on the optical card;

FIG. 18 is a graph representing the focusing error signal obtained by the optical pick-up illustrated in FIG. 12.

DESCRIPTION OF THE PREFERRED EMBODIMENTS

Figure 17:
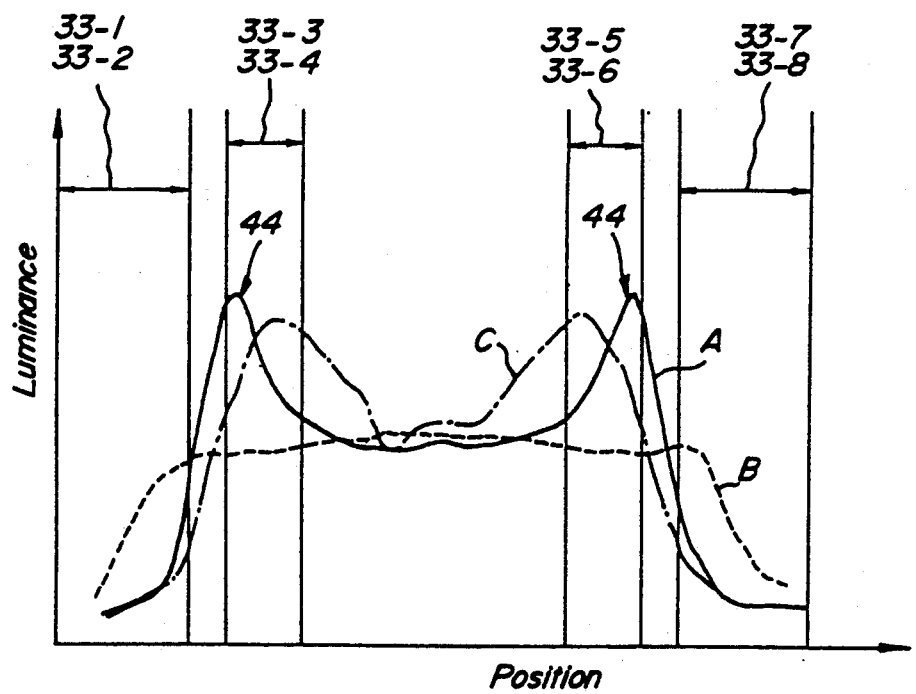
FIG. 17 is a graph showing the variation in the distribution of the light intensity of the image of the light spot.

FIGS. 1 and 2 show a first embodiment of the optical pick-up according to the invention. In the present embodiment, an optical card 1 and optical head are moved relative to each other in a track direction in which tracks formed on the optical card extend to read information recorded in the tracks on the optical card. A light emitting diode (LED) 2 serving as a light source is arranged at a point which is slightly far from a focal point $f_0$ of a collimator lens 3. A light beam emitted by the LED 2 is made incident upon the optical card 1 perpendicularly thereto by means of the collimator lens 3, half mirror 4, reflection mirror 5 and objective lens 6, so that the optical card 1 is illuminated by a de-focused light spot. A light beam reflected by the optical card 1 is collected by the objective lens 6 and then is made incident upon a photodetector 8 by means of the reflection mirror 5, half mirror 4 and imaging lens 7.

The objective lens 6 is supported by a holder 11 and the holder is supported by four parallel wires 12 movably in a focusing direction F which is parallel to an optical axis of the objective lens 6 as well as in a tracking direction T which is perpendicular both to the focusing direction F and to the track direction. The other ends of the resilient wires 12 are secured to a wire supporting block 13 which is fixed to a base member not shown. To the holder 11 are secured focusing coils 14A and 14B at its end faces which are opposed in the tracking direction T. Further a flexible print circuit board 16 on which tracking coils 15A and 15B are formed by the print circuit is secured to the holder 11 such that the tracking coils 15A and 15B are positioned outside the focusing coils 14A and 14B, respectively, To the base member not shown, are secured inner yokes 17A and 17B which are inserted into the focusing coils 14A and 14B, respectively, and are also secured two pairs of outer yokes 18A, 18B and 19A, 19B which are opposed to the inner yokes 17A and 17B, respectively via the focusing coils and tracking coils. On inner surfaces to the outer yokes 18A, 18B and 19A, 19B are cemented permanent magnets 20A, 20B and 21A, 21B, respectively. The permanent magnets 20A and 20B generate a magnetic flux which passes across the tracking coil 15A and focusing coil 14A, and similarly the permanent magnets 21A and 21B produces a magnetic flux which passes across the tracking coil 15B and focusing coil 14B. In this manner, by supplying a focusing error signal to the focusing coils 14A and 14B by means of two of the four wires 12, the holder 11 and thus the objective lens 6 is moved in the focusing direction F to effect the focus servo. At the same time, by supplying a tracking error signal to the tracking coils 15A and 15B by means of the remaining two wires, it is possible to move the objective lens 6 in the tracking direction T to preform the tracking servo. It should be noted that the LED 2, collimator lens 3, half mirror 4 reflection mirror 5, lens 7 and photodetector 8 are all secured to the base member.

FIG. 3 is plan view illustrating an example of the format of the tracks formed on the optical card 1 shown in FIG. 1. A track unit 25 comprises a guide track 26 formed by a regular array of square blocks and a plurality of data tracks arranged on both sides of the guide track 26. In this embodiment, eight data tracks are provided on respective sides of the guide track 26, so that the track unit 25 is composed of seventeen parallel tracks. On the optical card 1 a number of such track units are formed in parallel with each other in the track direction.

FIG. 4 is a plan view depicting an embodiment of the photodetector 8 shown in FIG. 2. The photodetector 8 comprises data reading light receiving regions 31-1 to 31-16 each corresponding to sixteen data tracks in a track unit, six pairs of clock generating light receiving regions 32-1 to 32-12, in each pair two light receiving regions being separated in the track direction such that they can receive image of front and rear edges of a square block of the guide track 26, and three pairs of focusing and tracking error detecting light receiving regions 33-1 to 33-6. In each pair of the focusing and tracking error detecting light regions 33-1 to 33-3, the light receiving regions are separated in a direction perpendicular to the track direction, i.e. in the tracking direction such that they receive images of opposite edges of the square blocks of the guide track pattern.

In the present embodiment, as stated above, the LED 2 is arranged behind the focal point $f_0$ of the collimator lens 3 so that the optical card 1 is illuminated by the de-focused light beam. Therefore, the illuminating light beam emanating from the objective lens 6 is converged at a point which is nearer to the objective lens than the focal point of the objective lens. Thus, when the in-focused condition of the objective lens 6 with respect to the optical card 1 is attained, i.e. when the focal point of the objective lens is positioned just on the optical card, the distribution of the light intensity of the illuminating light on the optical card 1 is shown by a solid curve A in FIG. 5. When the optical card 1 is moved closer to the objective lens 6, the diameter of the spot of the illuminating light formed on the optical card is reduced and the luminance distribution of the illuminating light on the optical card is changed into a dotted curve B in FIG. 5, and when the optical card 1 is moved away from the objective lens 6, the diameter of the illuminating light spot becomes larger and the luminance distribution of the illuminating light is changed as represented by a chain curve C in FIG. 5. In this manner, the luminance distribution of the illuminating light spot on the optical card is changed in accordance with a distance between the objective lens 6 and the optical card 1. As can be seen from the graphs shown in FIG. 5, there is produced a ring-shaped area 35 in which the luminance intensity of the illuminating light is not substantially changed even when the distance between the objective lens and the optical card is changed. In the present specification this area 35 is called the ring-shaped unchange area. As can be seen from the curves shown in FIG. 5, when the distance between the optical card 1 and the objective lens 6 is changed, the distribution of the luminance intensity shows opposite tendencies with respect to this unchanged area 35. That is to say, when the optical card is moved toward the objective lens, in an area within the ring-shaped unchanged area 35, the luminance intensity is increased when the optical card is moved toward the objective lens, but in area outside the unchanged area 35, the luminance intensity becomes smaller. When the optical card is moved away from the objective lens, in the inner region the intensity of the illuminating light is decreased, but in the outer region, the intensity is increased.

In the present embodiment, as illustrated in FIG. 4, the data reading light receiving regions 31-1 to 31-16 are arranged in an area within the unchanged area 35 of the image of the light spot formed on the photodetector 8 such that they aligned along a diameter of the ring-shaped unchanged area 35. A first pair of focusing and tracking error detecting light receiving regions 33-3 and 33-4 constituting the first receiving means are arranged such that their center points are aligned with a center axial line of the array of the light receiving regions 31-1 to 31-16. Two pairs of the focusing and tracking error detecting light receiving regions 33-1, 33-2 and 33-5, 33-6 constituting the second light receiving region are arranged symmetrically with respect to the first light receiving region 33-3 and 33-4 such that center points of these light receiving regions 33-1, 33-2, 33-5 and 33-6 situate in an area outside the ring-shaped unchanged area 35. Further, three pairs of the clock generating light receiving regions 32-1 to 32-6 are arranged between the light regions 33-1, 33-2 and 33-3, 33-4 and similarly three pairs of the clock generating light receiving regions 32-7 to 32-12 are arranged between the light receiving regions 33-3, 33-4 and 35-5, 33-6. A distance between successive clock generating light receiving regions 32-1, 32-2; 32-3, 32-4–32-11, 32-12 is set to a half of a pitch of the square blocks of the guide track 26. The focusing and tracking error detecting light receiving regions 33-1 to 33-6 have such a length that each of them can receive images of upper and lower side edges of plurality of square blocks of the guide track 26 and have such a width that a sufficiently large amount of light reflected by white portions having a high reflectance between the black square blocks and the data portions.

Output signals generated by the clock generating light regions 32-1, 32-3–32-11 which are arranged on one side of the guide track 26 are added together to derive a first sum signal and output signal generated by the clock generating light receiving regions 32-2, 32-4–32-12 are added together to derive a second sum signal. Then, a difference between said first and second sum signals to derive a clock signal.

Output signals generated by the light receiving regions 33-1, 33-3 and 33-5 which receive the images of upper side edges of square blocks are added together to derive a third a sum signal and similarly output signals generated by the light receiving regions 33-2, 33-4 and 33-6 which receive the images of lower side edges of square blocks are added together to derive a fourth sum signal. Then, a difference between the third and fourth sum signals is derived to produce the tracking error signal.

The output signals generated by the light receiving regions 33-3 and 33-4 situating within the unchanged area 35 are added togther to derive a fifth aignal and the output signals generated by the light receiving regions 33-1, 33-2, 33-5 and 33-6 situating the outside of the ring-shaped unchanged area 35 are added together to derive a sixth sum signal. A difference between the fifth and sixth sum signals is derived to produce the focusing error signal. It should be noted that the focusing error signal can be obtained as long as a sufficient amount of light is made incident upon the photodetector 8.

In the present embodiment, the focusing error signal is used to effect the focus servo control in which the objective lens 6 is moved in the optical axis direction such that the optical card 1 is positioned at the focal point of the objective lens. The objective lens 6 is moved also in the tracking direction in accordance with the tracking error signal such that the center point of the light spot of the illuminating light on the optical card 1 is positioned on a center line of a track unit 25. In this manner, the focusing and tracking serve control can be performed, while output signals generated by the data reading light receiving regions 31-1 to 31-16 are sampled in sychronism with the clock signal to derive the data signal composed of 16 bits.

In the present embodiment, the fifth sum signal of the output signals generated by the light receiving regions 33-3 and 33-4 situating within the ring-shaped unchanged area 35 is decreased substantially linearly in accordance with the increase in the distance between the optical card 1 and the objective lens 6 as shown by a curve $D_1$ in FIG. 6A; and the sixth sum signal of the output signals generated by the light receiving regions 33-1, 33-2, 33-5 and 33-6 situating outside the ring-shaped unchanged area 35 is increased substantially linearly in accordance with the increase in the distance between the optical card 1 and the objective lens 6 as depicted by a curve $D_2$. Therefore, by suitably adjusting the gains of these fifth and sixth sum signals such that their amplitudes becomes equal to each other in the in-focused position as illustrated in FIG. 6B, it is possible to derive the focusing error signal which varies abruptly and linearly over a very wide range and changes its polarity with respect to the in-focused position. In this manner, the focusing error can be detected at a very high sensitivity.

FIG. 7 is a schematic plan view showing another embodiment of the photodetector 8. In this embodiment, the first light receiving means situating within the ring-shaped unchanged area 35 is composed of two pairs of light receiving regions 33-7, 33-8 and 33-9, 33-10, which are arranged symmetrically so as to receive images of peripheral portions of the unchanged area 35. Further, four pairs of clock generating light receiving regions 32-1 to 32-10 are arranged between the light receiving regions 33-7, 33-8 and 33-9, 33-10. The remaining construction is same as that shown in FIG. 4. Also in this embodiment, the clock signal can be obtained by deriving a difference between a first sum signal of output signals generated by the clock generating light regions 32-1, 32-3, 32-5 and 32-7 and a second sum signal of output signals generated by the clock generating light receiving regions 32-2, 32-4, 32-6 and 32-8. Further the tracking error signal can be produced by deriving a difference between a third sum signal of light receiving regions 33-1, 33-7, 33-9 and 33-5 and a fourth sum signal of light receiving regions 33-2, 33-8, 33-10 and 33-6. The focusing error signal can be generated by deriving a difference between a fifth sum signal of output signals of the light receiving regions 33-7 to 33-10 situating within the unchanged area 35 and a sixth sum of to derive a fifth sum signal of output signals generated by the light receiving regions 33-1, 33-2, 33-5 and 33-6 situating outside the ring-shaped unchanged area 35. The fifth sum signal is decreased substantially linearly in accordance with the focus condition and the sixth sum signal is increased substantially linearly, so that it is possible to obtain the focusing error signal which changes abruptly. Therefore, also in this embodiment, the focusing error can be detected at a high sensitivity.

It should be noted that parts of the light receiving regions situating within the ring-shaped unchanged area 35 constituting the first light receiving means may be positioned outside the unchanged area, and similarly parts of the light receiving regions forming the second light receiving means may be situated within the unchanged area. According to the invention, the center points of the first and second light receiving means have to be positioned within and outside the ring-shaped unchanged area 35, respectively. Further, the numbers of light receiving regions of the first and second light receiving means are not limited to those of the above mentioned embodiments. In the embodiments so far explained, in order to derive the tracking error signal in addition to the focusing error signal, the focusing and tracking error detecting light receiving regions are arranged in a pairwise manner such that the images of upper and lower side edges of the square blocks of the guide track 26 are received. However, when it is not necessary to detect the tracking error, it is not necessary to arrange the light receiving regions in a pairwise manner to receive the images of the square blocks. Furthermore, the present invention could be equally applied to any kind of the optical record medium other than the optical card.

FIGS. 8 and 9 show a second embodiment of the optical pick-up according to the invention for reading information recorded on an optical card. FIG. 8 is a cross section cut along a line parallel with a plane of the optical card, and FIG. 9 is a cross section cut along a line perpendicular to the plane of the optical card. Also in the present embodiment, an optical card 1 and an optical head are moved relative to each other in a track direction in which tracks formed on the optical card extend to read information recorded in the tracks on the optical card, A light emitting diode (LED) 2 serving as a light source is arranged at a point which is slightly nearer to a collimator lens 3 than a focal point $f_0$ of the collimator lens. In this embodiment, the collimator lens 3 is arranged behind a half mirror 4. A light beam emitted by the LED 2 is made incident upon the optical card 1 perpendicularly thereto by means of the half mirror 4, collimator lens 3, reflection mirror 5 and objective lens 6, so that the optical card 1 is illuminated by a defocused light spot. A light beam reflected by the optical card 1 is collected by the objective lens 6 and then is made incident upon a photodetector 8 by means of the reflection mirror 5, collimator lens 3 and half mirror 4. In the present embodiment, the photodetector 8 is arranged on a focal point $f_0$ of the collimator lens 3, so that an image of a portion of the optical card 1 illuminated by the illuminating light beam is formed on the photodetector 8 by means of the objective lens 6 and collimator lens 3. A part of the illuminating light beam reflected by the half mirror 4 is made incident upon a light receiving element 9, and the operation of the LED 2 is controlled by an output signal of the light receiving element such that the intensity of the LED becomes constant. The LED 2, half mirror 4, collimator lens 3, reflection mirror 5, photodetector 8 and light receiving element 9 are secured to a frame member 10 which is secured to a base member not shown.

The objective lens 6 is supported by a holder 11 and the holder is supported by four parallel wires 12 movably in a focusing direction F which is parallel to an optical axis of the objective lens 6 as well as in a tracking direction T which is perpendicular both to the focusing direction F and to the track direction. The other ends of the resilient wires 12 are secured to a wire supporting block 13 which is fixed to the base member not shown. To the holder 11 are secured focusing coils 14A and 14B at end faces which are opposed in the tracking direction T. Further a flexible print circuit board 16 on which tracking coils 15A and 15B are formed by the print circuit is secured to the holder 11 such that the tracking coils 15A and 15B are positioned outside the focusing coils 14A and 14B, respectively.

To the base member, are secured inner yokes 17A and 17B which are inserted into the focusing coils 14A and 14B, respectively, and are also secured a pair of outer yokes 18A, 18B and 19A, which are opposed to the inner yokes 17A and 17B, respectively via the focusing coils and tracking coils. On inner surfaces to the outer yokes 18A, 18B and 19A, 19B are cemented permanent magnets 20A, 20B and 21A, 21B, respectively. The permanent magnets 20A and 20B generates a magnetic flux which passes across the tracking coil 15A and focusing coil 14A, and similarly the permanent magnets 21A and 21B produces a magnetic flux which passes across the tracking coil 15B and focusing coil 14B. In this manner, by supplying a focus error signal to the focusing coils 14A and 14B by means of two of the four wires 12, the holder 11 and thus the objective lens 6 is moved in the focusing direction F to effect the focus servo. At the same time, by supplying a tracking error signal to the tracking coils 15A and 15B by means of the remaining two wires, it is possible to move the objective lens 6 in the tracking direction T to perform the tracking servo.

Also in this embodiment, the data recorded on the optical card 1 having the same track format illustrated in FIG. 3 is to be read out.

FIG. 10 is a schematic plan view showing the construction of the photodetector 8. In this embodiment, the photodetector 8 comprises sixteen data reading light receiving regions 31-1 to 31-16, six pairs of clock generating light receiving regions 32-1 to 32-12 which are separated in the track direction so as to receive images of square blocks of the guide track 26, and four pairs of focusing and tracking error detecting light receiving regions 33-1 to 33-8 which are arranged to receive images of opposite edges of square blocks.

As mentioned above, in the present embodiment, the LED 2 is arranged nearer to the collimator lens 3 with respect to its focal point $f_0$ and the optical card 1 is illuminated by the de-focused light spot, and therefore the illuminating light beam is converged at a point far from the focal point of the objective lens 6. Therefore, also in the present embodiment, the luminance distribution of the illuminating light spot on the optical card 1 shows the same tendency as that shown in FIG. 4 and there is formed the ring-shaped unchanged area 35 in which the luminance intensity of the illuminating light spot is not changed even if the distance between the optical card 1 and the objective lens 6 is varied. Further, the portion of the optical card 1 within the ring-shaped unchanged area 35 is sufficiently illuminated when the optical card is positioned at the focal point of the objective lens 6. The data reading light receiving regions 31-1 to 31-16 are arranged within the ring-shaped unchanged area 35 along a diameter thereof. The two pairs of the focusing and tracking error detecting light receiving regions 33-3, 33-4 and 33-5, 33-6 are arranged symmetrically within the unchanged area 35 such that they receive images of portion of the optical card near the periphery of the unchanged area. The remaining two pairs of the focusing and tracking error detecting light receiving regions 33-1, 33-2 and 33-5, 33-6 are arranged such that their center points are situated outside the ring-shaped unchanged area 35. A distance between successive pairs of the clock generating light receiving regions 32-1, 32-2; 32-3, 32-4; –32-11, 32-12 is set to a half of a pitch of the square blocks of the guide track 26. The focusing and tracking error detecting light receiving regions 33-1 to 33-8 have a length equal to an integer multiple of the pitch of the square blocks such that they can receive images of upper and lower edges of square blocks and have such a width that they can receive a sufficient amount of light reflected by white portions having a high reflectance between the black square blocks and the data pit areas. Since the brightness of the images received by the light receiving regions 33-1, 33-2, 33-7 and 33-8 situating outside the unchanged area 35 is low, the length of these light receiving regions is made longer than that of the light receiving regions 33-3 to 33-6 within the unchanged area 35.

It should be noted that a ratio of the focal length of the collimator lens 3 to the focal length of the objective lens 6 is set to 1:4, so that a ratio of the diameter of the light emitting area of the LED 2 to the diameter of the ring-shaped unchanged area 35 becomes equal to a ratio of the pitch of images of data areas formed on the photodetector 8 to the pitch of data areas on the optical card 1. When the pitch of the data areas on the optical card 1 viewed in the direction perpendicular to the track direction is 5 μm (width of a unit track is 95 μm), the pitch of the data reading light receiving regions 31-1 to 31-16 amounts to 20 μm, which makes easy the manufacture of the photodetector 8.

The clock signal, focusing error signal and tracking error signal can be derived in entirely the same manner as that of the previous embodiment. Particularly, the focusing error can be detected at a very high sensitivity.

As shown in FIG. 11, the focusing error signal becomes zero not only at the in-focused position O, but also at a point Z which is conjugate to the in-focused point with respect to the converging point of the illuminating light beam. When the optical card 1 is moved away from the point Z, the polarity of the focusing error signal is changed and the correct focus servo could not be performed any more. In order to obtain a wide dynamic range of the focusing error detection, it is desirable to make a distance 1 between the points O and Z as long as possible. However, if the distance 1 is made longer than about 800 μm, the intensity of light impinging upon the photodetector 8 becomes low, so that the influence of noise becomes large. Further, if the distance 1 is made smaller than about 200 μm, the focus servo is liable to be lost due to noise in the signal processing means, defects on the optical card 1, and variation of the output signals generated by the focusing error detecting light receiving regions during the seek in which the optical head is moved in the direction perpendicular to the track direction to find a desired track unit. The inventors have found experimentally that the distance 1 is preferably set to about 200 to 800 μm. That is to say, it is preferable to set a distance between the in-focused point of the objective lens 6 to the converging point of the illuminating light beam to about 100 to 400 μm.

As usual, when the focus-on is started, the objective lens 6 is forcedly moved in a direction away from the optical card 1, while the focusing error signal is monitored to find its zero crossing. Upon the focus-on, when the optical card 1 is positioned within a normal range having a length of +1 and −1 on both sides of the in-focused point O, the objective lens 6 comes into a focus servo range after a short time and after that the usual focus servo is performed stably. Upon the focus-on, when the optical card 1 is in a quasi-normal range in FIG. 11, the focus servo is initiated when the objective lens comes into the focus servo range. During this operation, there might be a case in which the objective lens 6 is moved out of the normal servo range due to its inertia and goes into an inverted range. In this case, the focus-on operation is once stopped and the objective lens 6 is moved in the direction closer to the optical card 1 by supplying a bias current having a given polarity to the focusing coils 14A and 14B, and then the focus-on is initiated again. During this movement of the objective lens toward the optical card, when the objective lens comes into the normal servo range, the focus servo is started. Upon the focus-on, when the objective lens 6 is in the inverted range, the focusing error signal does not become zero. Then the focus-on operation is once stopped and the objective lens 6 is forcedly moved in the direction closer to the optical card 1, so that the objective lens 6 comes within the normal range. Then, the focus-on operation is restarted to move the objective lens into the normal servo range. That is to say, when the focusing error signal does not change or two zero crossings are detected during the focus-on operation, the focus-on operation is once stopped and then the objective lens is forcedly moved into the normal range by supplying the bias current having a given polarity to the focusing coils and after that the focus-on operation is initiated again. In this manner, the focus servo can be performed accurately regardless of the position of the objective lens 6 with respect to the optical card 1 upon the initiation of the focus-on operation.

In the above mentioned embodiments, the LED is arranged at the de-focused position with respect to the collimator lens and the light beam is made incident upon the optical card as the de-focused light spot by means of the objective lens. The light beam reflected by the optical card is received by the photodetector by means of the objective lens and the focus condition of the optical card with respect to the objective lens is detected on the basis of the luminance distribution of the illuminating light spot on the optical card.

The above mentioned optical pick-up has an advantage that the focus condition can be detected at a high sensitivity. However, in the above mentioned embodiments of the optical pick-up according to the invention, it is sometimes difficult to obtain the focusing error signal stably when used in made of a light emitting diode as the light source due to the variation in the distribution of the light intensity of the light emitting diode. Further, a dynamic range of the focusing error detection is limited within about 120 μm, so that the focus condition could not be detected over a sufficiently wide range.

FIG. 12 is a schematic view showing a third embodiment of the optical pick-up according to the invention. In the present embodiment, a light beam emitted by an LED 2 constituting the light source is transmitted through a sapphire ball 41 made of sapphire having a refractive index of about 1.8 and having a large spherical aberration. The light beam transmitted through the sapphire ball 41 is made incident upon an optical card 1 by means of collimator lens 3, beam splitter 42 and objective lens 6. A light beam reflected by the optical card 1 is made incident upon a photodetector 8 by means of the objective lens 6, beam splitter 42 and imaging lens 7.

As illustrated in FIG. 13, the sapphire ball 41 secured onto the LED 2 by means of an adhesive agent such that a center of the sapphire ball is aligned with a center line of a light emitting area 2a of the LED 2.

When the LED 2 is operated to emit the light beam, there is produced a ring-shaped bright portion 41a on the surface of the sapphire ball 41 as shown in FIG. 14 due to the spherical aberration. For instance, when a diameter of the light emitting area 2a of LED 2 is 35 μm and a diameter of the sapphire ball is 500 μm, an angle θ of a diverging light beam emanating from the sapphire ball becomes about 11 degrees and a diameter of the ring-shaped bright portion 41a becomes about 400 μm.

FIG. 15 is a schematic plan view illustrating an embodiment of the photodetector 8 shown in FIG. 12. It should be noted that the track format of the optical card 1 is identical with that shown in FIG. 3. The photodetector 8 comprises sixteen data reading light receiving regions 31-1 to 31-16 aligned in the direction perpendicular to the track direction, three pairs of clock generating light receiving regions 32-1 to 32-6 which are separated in the track direction such that they receive images of black square blocks in the guide track 26, and four pairs of focusing and tracking error detecting light receiving regions 33-1 to 33-8. The three pairs of the clock generating light receiving regions 32-1 to 32-6 are separated from each other such that they receive images of front and rear side edges of successive square blocks of the guide track 26. Two light receiving regions in each pairs of the focusing and tracking error detecting light receiving regions 33-1 to 33-8 are separated in the direction perpendicular to the track direction such that they receive images of upper and lower edges of square blocks. The first and fourth focusing and tracking error detecting light receiving regions 33-1, 33-2 and 33-7, 33-8 are arranged such that their center points situate outside an image 43 of the light emitting area 2a of LED 2, and the second and third focusing and tracking error detecting light receiving regions 33-3, 33-4 and 33-5, 33-6 are arranged within the image 43.

Also in the present embodiment, the clock signal can be obtained by deriving a difference between a first sum signal of output signals of the clock generating light receiving regions 32-1, 32-3 and 32-5 and a second sum signal of output signals of the clock generating light receiving regions 32-2, 32-4 and 32-6. The data signal is read out in synchronism with the thus derived clock signal. Further, the tracking error signal is obtained by deriving a difference between a third sum signal of output signals of the light receiving regions 33-1, 33-3, 33-5 and 33-7 and a fourth sum signal of output signals of the light receiving regions 33-2, 33-4, 33-6 and 33-8. Moreover, the focusing error signal can be obtained by deriving a difference between a fifth sum signal of output signals of the light receiving regions 33-1, 33-2, 33-7 and 33-8 situating outside the image 43 of the light emitting area 2a and a sixth sum signal of output signals of the light receiving regions 33-3, 33-4, 33-5 and 33-6 situating within the image 43 of the light emitting area 2a.

When the distance between the LED 2 on which the sapphire ball 41 is secured and the collimator lens 3 is changed under such a condition that the optical card 1 is in the in-focused point of the objective lens 6, the luminance distribution of the image of the light emitting area 2a of LED 2 on the photodetector 8 varies as shown by a solid line A in FIG. 16. When the light emitting area 2a of LED 2 is shifted toward the collimator lens 3, a position of a caustic surface 44 is shifted outwardly, and when the light emitting area 2a is moved closer to the collimator lens 3, the position of the caustic surface 44 is shifted inwardly.

In the present embodiment, the position of the sapphire ball 41 and the magnification of the optical system are so set that under the in-focused condition of the optical card 1 with respect to the objective lens 6, the caustic surface 44 is positioned near outer edges of the focusing and tracking error detecting light receiving regions 33-3, 33-4 and 33-5, 33-6 viewed in the directed of the diameter of the image of the light emitting area 2a on the photodetector 8 as illustrated by a solid line A in FIG. 17. Then, the distribution of the luminance of the light spot projected onto the photodetector 8 is changed as shown by a dotted line B or a chain line C in FIG. 17 when the optical card 1 is moved closer to or away from the objective lens 6 with respect to the focal point of the objective lens 6. That is to say, when the optical card 1 is moved toward the objective lens 6 from the in-focused point, an amount of light received by the outer light receiving regions 33-1, 33-2, 33-7 and 33-8 is increased and an amount of light received by the inner light receiving regions 33-3, 33-4, 33-5 and 33-6 is decreased. When the optical card 1 is moved away from the objective lens 6, an amount of light impinging upon the outer light receiving regions 33-1, 33-2, 33-7 and 33-8 is decreased and an amount of light received by the inner light receiving regions 33-3, 33-4, 33-5 and 33-6 is increased.

Therefore, by amplifying the sixth sum signal of output signals of the outer light receiving regions 33-1, 33-2, 33-7 and 33-8 by such a factor that in the in-focused condition a difference between the sixth sum signal and the fifth sum signal of output signals of the inner light receiving regions 33-3, 33-4, 33-5 and 33-6 becomes zero, it is possible to obtain the focusing error signal without being affected by the variation in the intensity distribution of the light generated by the light emitting area 2a of LED 2 as shown by a solid curve A in FIG. 18. As can be seen from FIG. 18, the focusing error can be detected stably over a very wide range such as about 430 μm. In FIG. 18, a dotted curve B denotes the sixth sum signal and a chain curve C represents the amplified fifth sum signal.

It should be noted that in the present embodiment the sapphire ball 41 having the spherical aberration is directly secured onto the light emitting diode, but any optical element which introduces the spherical aberration may be inserted between the light source and the beam splitter which divides the incident light path and the reflected light path.

As explained above, according to the present embodiment, the focusing error signal can be obtained. stably over a very wide range in regardless of the variation in the distribution of the luminance intensity of the light emitted by the light source.

What is claimed is:

1. An optical pick-up for recording and/or reproducing information on and/or from an optical record medium comprising:

illuminating means for projecting a de-focused light beam perpendicularly onto the optical record medium;

first light receiving means arranged for receiving a portion of a light beam reflected by said optical record medium which is located within an unchanged area in which the luminance does not substantially change in accordance with the focus condition to derive a first signal;

second light receiving means arranged for receiving a portion of a light beam reflected by said optical record medium which is located one of (i) totally outside or (ii) at least primarily outside said unchanged area to derive a second signal; and a signal processing means for receiving said first and second signals generated by first and second light receiving means to derive a focussing error signal which represents a focusing error of said illuminating means with respect to said optical record medium.

2. An optical pick-up according to claim 1, wherein said illuminating means comprises a light source for emitting a light beam, a collimator lens for transmitting the light beam emitted from the light source, an objective lens for projecting the light beam emanating from the collimator lens onto the optical record medium, and a beam splitter arranged between the light source and the objective lens for guiding the light beam emitted from the light source to the objective lens and introducing the light beam reflected by the optical record medium and collected by the objective lens into the first and second light receiving means, whereby said light source is arranged at a point which is slightly shifted from a focal point of the collimator lens.

3. An optical pick-up according to claim 2, wherein said beam splitter is arranged between the collimator lens and the objective lens.

4. An optical pick-up according to claim 3, wherein said the focal point of the collimator lens is positioned between the light source and the collimator lens.

5. An optical pick-up according to claim 4, wherein said light source comprises a light emitting diode.

6. An optical pick-up according to claim 3, wherein said light source is arranged between the collimator lens and the focal point of the collimator lens.

7. An optical pick-up according to claim 6, wherein said light source comprises a light emitting diode.

8. An optical pick-up according to claim 2, wherein said beam splitter is arranged between the light source and the collimator lens.

9. An optical pick-up according to claim wherein the focal point of the collimator lens is positioned between the light source and the collimator lens.

10. An optical pick-up according to claim 9, wherein said light source comprises a light emitting diode.

11. An optical pick-up according to claim 8, wherein said light source is arranged between the collimator lens and the focal point of the collimator lens.

12. An optical pick-up according to claim 11, wherein said light source comprises a light emitting diode.

13. An optical pick-up according to claim 1, wherein said unchanged area is ring-shaped, said first light receiving means comprises a plurality of light receiving regions which are arranged within said ring-shaped unchanged area and said second light receiving means comprises a plurality of light receiving regions which are arranged outside said ring-shaped unchanged area, whereby said light receiving regions are formed in a single photodetector.

14. An optical pick-up according to claim 13, wherein said signal processing means comprises a first adder for deriving a first sum signal of output signals of said plurality of light receiving regions of the first light receiving means, a second adder for deriving a second sum signal of output signals of said plurality of light receiving regions of said second light receiving means, and a subtracter for deriving a difference between said first and second sum signals, said difference representing the focusing error signal.

15. An optical pick-up for recording and/or reproducing information on and/or from an optical record medium comprising:
a light source for emitting a light beam;
a beam splitter for transmitting or reflecting said light beam emitted from the light source;
a collimator lens for receiving the light beam emanating from said beam splitter, said light source being arranged at a de-focused position with respect to said collimator lens;
an objective lens for projecting the light beam emanating from said collimator lens onto an optical record medium and for introducing a light beam reflected by the optical record medium into the collimator lens and beam splitter;
a photodetector for receiving the light beam which is reflected by the optical record medium, transmitted through the objective lens and collimator lens and reflected by or transmitted through the beam splitter, said photodetector being arranged at a focal point of said collimator lens and deriving a signal; and
a signal processor for receiving said signal to derive a focusing error signal.

16. An optical pick-up according to claim 15, wherein said light source is spaced from a focal point of the collimator lens such that a distance between a focal point of said objective lens and a point at which the light beam emanating from the objective lens is converged is about 100–400 $\mu m$.

17. An optical pick-up according to claim 15, wherein said photodetector comprises a first light receiving means for receiving a portion of a light beam reflected by said optical record medium which is located within an unchanged area in which the luminance does not substantially change in accordance with the focus condition to derive a first signal and a second light receiving means arranged for receiving a portion of a light beam reflected by said optical record medium which is located one of (i) totally outside or (ii) at least primarily outside said unchanged area to derive a second signal, and said signal processor comprises a subtracter for deriving a difference between said first and second signals generated by said first and second light receiving means to derive the focusing error signal.

18. An optical pick-up according to claim 17, wherein said unchanged area is ring-shaped, said first light receiving means comprises a plurlaity of light receiving regions and a first adder for adding output signals generated by said light receiving regions to derive said first signal, and said second light receiving means comprises a plurlaity of light receiving regions and a second adder for adding output signals generated by the light receiving regions to derive said second signal.

19. An optical pick-up according to claim 18, wherein said focal point of the collimator lens is positioned between the light source and the collimator lens.

20. An optical pick-up according to claim 19, wherein said light source comprises a light emitting diode.

21. An optical pick-up according to claim 18, wherein said light source is arranged between to the collimator lens and the focal point of the collimator lens.

22. An optical pick-up according to claim 21, wherein said light souce comprises a light emitting diode.

23. An optical pick-up for recording and/or reproducing information on and/or from an optical record medium comprising:
a light source for emitting a light beam;
an optical element for introducing a spherical aberration into said light beam emitted by said light source;
a beam splitter for reflecting or transmitting said light beam emanating from said optical element;
an objective lens for projecting the light beam emanating from said beam splitter onto the optical record medium and receiving a light beam relfected by an optical record meduim;
a photodetector for receiving the light beam which is reflected by the optical record medium, transmitted through the ojective lens and transmitted through or reflected by said beam splitter to derive a signal; and
a signal processor for receiving said signal generated by said photodetector to derive a focusing error signal.

24. An optical pick-up acording to claim 23, wherein said optical element for introducing the spherical aberration is formed by a ball made of optical material.

25. An optical pick-up according to claim 24, wherein said ball is formed by a sapphire ball having a refractive index of about 1.8.

26. An optical pick-up according to claim 25, wherein said light source is formed by a light emitting diode having a light emitting area, and said sapphire ball is directly secured onto said light emitting area of the light emitting diode.

27. An optical pick-up according to claim 26, wherein said light emitting area of the light emitting diode has a diameter of about 35 $\mu m$ and said sapphire ball has a diameter of about 500 $\mu m$.

28. An optical pick-up according to claim 23, further comprising a collimator lens arranged between the light source and the beam splitter, and said light source is arranged at a point which is shifted from a focal point of the collimator lens.

29. An optical pick-up according to claim 28, wherein said photodetector comprises a first light receiving means having a plurality of light receiving regions arranged within a caustic surface of an image of a light beam spot formed on the optical record medium under a in-focused condition of the objective lens and optical record medium, and a second light receiving means having a plurality of light receiving regions arranged outside said caustic surface under the in-focused condition, and said signal processor comprises a first adder for adding ouput signals of said plurality of light receiving regions of the first light receiving means to derive a first sum signal, a second adder for adding output signals of said plurality of light receiving regions of the second light receiving means to derive a second sum signal, and a subtracter for deriving a difference between the first and second sum signals to produce the focusing error signal.

30. An optical pick-up according to claim 29, wherein said signal processor further comprises a means of adjusting a gain of at least one of the first and second sum signals such that said difference between the first and second sum signals becomes zero in the in-focused condition.

* * * * *